US012478597B2

(12) United States Patent
Ikeda et al.

(10) Patent No.: US 12,478,597 B2
(45) Date of Patent: Nov. 25, 2025

(54) MOUSE MYOPIA-INDUCED MODEL AND ENDOPLASMIC RETICULUM STRESS SUPPRESSANT FOR PREVENTING AND SUPPRESSING MYOPIA

(71) Applicant: TSUBOTA LABORATORY, INC., Tokyo (JP)

(72) Inventors: Shinichi Ikeda, Tokyo (JP); Xiaoyan Jiang, Tokyo (JP); Kazuo Tsubota, Tokyo (JP); Toshihide Kurihara, Tokyo (JP)

(73) Assignee: TSUBOTA LABORATORY, INC., Tokyo (JP)

( * ) Notice: Subject to any disclaimer, the term of this patent is extended or adjusted under 35 U.S.C. 154(b) by 909 days.

(21) Appl. No.: 16/561,776

(22) Filed: Sep. 5, 2019

(65) Prior Publication Data

US 2020/0150457 A1    May 14, 2020

Related U.S. Application Data

(63) Continuation-in-part of application No. PCT/JP2018/008554, filed on Mar. 6, 2018.

(30) Foreign Application Priority Data

Mar. 6, 2017   (JP) .................................. 2017-041349

(51) Int. Cl.
| | |
|---|---|
| *A61K 31/192* | (2006.01) |
| *A01K 67/02* | (2006.01) |
| *A61K 9/00* | (2006.01) |
| *A61K 31/575* | (2006.01) |
| *G02C 7/06* | (2006.01) |

(52) U.S. Cl.
CPC .......... *A61K 31/192* (2013.01); *A01K 67/02* (2013.01); *A61K 9/0048* (2013.01); *A61K 31/575* (2013.01); *G02C 7/06* (2013.01); *A01K 2227/105* (2013.01); *A01K 2267/03* (2013.01)

(58) Field of Classification Search
CPC .......... A01K 2227/105; A01K 2267/03; A01K 67/02; A61K 31/155; A61K 31/192; A61K 31/235; A61K 31/365; A61K 31/4706; A61K 31/472; A61K 31/519; A61K 31/575; A61K 31/7088; A61K 9/0048; A61P 27/10; C12Q 1/04; G01N 33/15; G01N 33/50; G02C 7/06
See application file for complete search history.

(56) References Cited

U.S. PATENT DOCUMENTS

| | | | | |
|---|---|---|---|---|
| 8,962,686 B2 * | 2/2015 | Lam | ........ | A61K 45/06 514/546 |
| 2006/0073213 A1 * | 4/2006 | Hotamisligil | ........ | A61K 31/192 514/460 |
| 2012/0077828 A1 | 3/2012 | Axten et al. | | |
| 2012/0101074 A1 | 4/2012 | Lam et al. | | |
| 2014/0323455 A1 | 10/2014 | Vavvas | | |

FOREIGN PATENT DOCUMENTS

| | | |
|---|---|---|
| CN | 1191074 C | 3/2005 |
| CN | 102917588 B | 10/2014 |
| CN | 103037691 B | 2/2016 |
| JP | 7-258083 A | 10/1995 |
| JP | 9-315954 A | 12/1997 |
| JP | 2003-520228 A | 7/2003 |
| JP | 2007-514760 A | 6/2007 |
| JP | 2008-513465 A | 5/2008 |
| JP | 2013-525451 A | 6/2013 |
| JP | 2013-534902 A | 9/2013 |
| JP | 2014-504873 A | 2/2014 |
| WO | 01/52832 A1 | 7/2001 |
| WO | 2005/062818 A2 | 7/2005 |
| WO | 2006/031931 A2 | 3/2006 |
| WO | 2010/010702 A1 | 1/2010 |
| WO | 2011/119663 A1 | 9/2011 |
| WO | 2011/137173 A1 | 11/2011 |
| WO | 2012/097213 A2 | 7/2012 |
| WO | WO-2014049366 A1 * | 4/2014 .......... A61K 31/145 |
| WO | 2015/064768 A1 | 5/2015 |
| WO | 2016/171282 A1 | 10/2016 |

OTHER PUBLICATIONS

Zhou, Investigative Ophthalmology & Visual Science Apr. 2014, vol. 55 (Year: 2014).*
Coscas, Phathologic Myopia, Chapter 13.1, 2006 and Jonas, Eye (Lond). Feb. 2014; 28(2): 113-117. (Year: 2014).*
Ophthalmol Vis Sci. Mar. 2012; 53(3): 1557-1565. (Year: 2012).*
Praveen et al, (Am J Ophthalmol. Jan. 2008; 145(1): 176-181). (Year: 2008).*
Marr et al (Eye (2001) 15, 70-74 © 2001) (Year: 2011).*
Schaeffel, F. & Feldkaemper, M., "Animal models in myopia research", Clin Experimental Optometry, 2015, vol. 98, pp. 507-517 (11 pages total).
Kolb, P.S. et al., "The therapeutic effects of 4-phenylbutyric acid in maintaining proteostasis", The International Journal of Biochemistry & Cell Biology, 2015, vol. 61, pp. 45-52 (8 pages total).
Chen, Y. et al., "Chemical chaperones reduce ER stress and adipose tissue inflammation in high fat diet-induced mouse model of obesity", Scientific Reports, 2016, vol. 6, No. 27486, DOI: 10.1038/srep27486 (8 pages total).

(Continued)

Primary Examiner — Jean P Cornet
(74) *Attorney, Agent, or Firm* — Sughrue Mion, PLLC

(57) ABSTRACT

A model that closely resembles human excessive myopia can be prepared by mounting a minus lens (2) and a protector (4) to a juvenile mouse, the minus lens having an angle and a width adjustable in response to growth of the mouse. Further, this model analysis shows that myopia induction causes endoplasmic reticulum stress in a sclera and the endoplasmic reticulum stress induces myopia. Furthermore, it is revealed that an endoplasmic reticulum stress suppressant, particularly, phenylbutyrate and tauroursodeoxycholic acid act as a myopia prevention/suppression agent.

6 Claims, 5 Drawing Sheets

(56) References Cited

OTHER PUBLICATIONS

Hetz, C., "The unfolded protein response: controlling cell fate decisions under ER stress and beyond", Nature reviews, Molecular cell biology, Feb. 2012, vol. 13, pp. 89-102 (14 pages total).

Guillen, C., "Azoramide: a new drug for the treatment of type 2 diabetes?", Annals of Translational Medicine, 2016, vol. 4, Suppl 1. S45 (3 pages total).

Liu, H. et al., "The Natural Occurring Compounds Targeting Endoplasmic Reticulum Stress", Evidence-Based Complementary and Alternative Medicine, 2016, vol. 2016, Article ID 7831282 (14 pages total).

Zhou, Sheng et al., "ER stress mediate crystalline alpha A alteration in high myopia related cataract", Investigative Ophthalmology and Visual Science, Apr. 1, 2014, vol. 55, Issue 13, p. 4054, XP009516554 (1 page total).

Hetz, Claudio et al., "Targeting the unfolded protein response in disease", Nature Reviews, Drug Discovery, Sep. 2013, vol. 12, pp. 703-719, XP055557628 (17 pages total).

Fu, Suneng, et al., "Phenotypic assays identify azoramide as a small-molecule modulator of the unfolded protein response with antidiabetic activity", Science Translational Medicine, Jun. 2015, vol. 7, Issue 292, 292ra98, XP055557634 (14 pages total).

Gu, Yuan, et al., "Arctigenin alleviates ER stress via activating AMPK", Acta Pharmacologica Sinica, 2012, vol. 33, pp. 941-952, XP055557639 (12 pages total).

Tkatchenko, T.V., et al., "Mouse Experimental Myopia Has Features of Primate Myopia", Investigative Opthalmology & Visual Science, Mar. 2010, vol. 51, No. 3, pp. 1297-1303, XP055561777 (7 pages total).

Hans Bloemendal, et al., "Ageing and vision: structure, stability and function of lens crystallins", Progress in Biophysics & Molecular Biology, 2004, vol. 86, pp. 407-485 (79 pages total).

\* cited by examiner

MOUSE MYOPIA-INDUCED MODEL AND ENDOPLASMIC RETICULUM STRESS SUPPRESSANT FOR PREVENTING AND SUPPRESSING MYOPIA

CROSS REFERENCE TO RELATED APPLICATIONS

This application is a Continuation-in-Part application of International Application No. PCT/JP2018/008554 filed Mar. 6, 2018, claiming priority based on Japanese Patent Application No. 2017-041349, filed Mar. 6, 2017, the contents of all of which are incorporated herein by reference in their entirety.

FIELD OF THE INVENTION

The present invention relates to a mouse myopia-induced model to clarify the mechanism by which myopia occurs, and a method for preparing the same, an agent for suppressing myopia, and a myopia prevention/suppression medicine screening method.

BACKGROUND ART

It is said that East Asian people have a higher ratio of myopia than Westerners and that for Japanese, at least about ⅓ of the population, i.e., about 40 million people have myopia. Nevertheless, the molecular mechanism of occurrence and progression of myopia has not been clarified at all, and corrections with glasses or contact lenses are conducted although the radical treatment is not available.

Myopia refers to a condition in which an image is focused in front of the retina and thus one cannot see clearly. Myopia can be broadly classified into two types: refractive myopia caused by too high refractive index of cornea and crystalline lens; and axial myopia caused by too long axial length of the eye, which is a length in back and forth direction of the eyeball. The refractive myopia refers to a condition in which an image is focused in front of the retina because the thickness of the crystalline lens, which works as a lens, is not properly adjusted. The axial myopia refers to a condition in which an image is focused in front of the retina even when the crystalline lens is adjusted sufficiently thin because of too long axial length of the eye (see "Axial myopia" in FIG. 1). Most myopia patients suffer from the axial myopia.

Strong axial myopia, i.e., a condition called excessive myopia increases the degree of extension of the eye axis. As a result, the retina and the choroid are elongated backward and thus load on them increases, causing various abnormalities in the fundus. A condition in which abnormality occurs in the fundus is called pathologic myopia, and is the higher cause of blindness in developed countries. Ministry of Health, Labour and Welfare reported that in Japan, the fourth causative disease of blindness is pathologic myopia (2005 MHLW Retinal Choroidal Optic Atrophy Research Report). Although pathologic myopia may risk blindness, effective treatment is not currently available, and there is a need to establish treatment.

Conventional myopia researches have been carried out by inducing myopia to animals such as chick, tree shrew, and guinea pig (Non-Patent Document 1). Among others, chick is frequently used as a model animal for myopia research because it has advantages such as being diurnal, relatively large in eyes, and easy to handle. Chick is still currently used as the main myopia model even after more than 35 years have passed since the myopia model using chick was introduced. In addition to chick, various animals are used in myopia research, including tree shrew, marmoset, guinea pig, rhesus monkey, or the like. However, it is not easy to perform gene manipulation for any of these animals and thus none of them is suited for research of genetic elements for myopia. Because frequency of myopia occurrence has ethnic difference as described above, it is considered that myopia occurrence depends largely on environment element as well as genetic element. However, the lack of myopia-induced model animals that allow for research of genetic elements contributes to the fact that treatment for suppressing myopia is not established yet.

In recent years, mouse myopia models have been reported, and progress of the genetic research of myopia is expected. Although it was initially doubted whether it is possible to induce myopia to a mouse using a minus lens as in chick because the mouse is nocturnal, mouse myopia-induced models using a minus lens have been prepared (Non-Patent Document 2).

Patent Documents

Patent Document 1: WO2015/064768
Patent Document 2: Japanese Translation of PCT International Application No. 2013-534902

Non-Patent Documents

Non-Patent Document 1: Schaeffel F. & Feldkaemper M., 2015, Clin. Exp. Optom., Vol. 98, p. 507-517
Non-Patent Document 2: Tkatchenko T. V. et al., 2010, Invest. Ophthalmol. Vis. Sci., Vol. 51, p. 1297-1303
Non-Patent Document 3: Kolb P. S. et al., 2015, Int. J. Biochem. Cell Biol., Vol. 61, p. 45-52
Non-Patent Document 4: Chen Y. et al., 2016, Scientific Reports, 6: 27486, DOI: 10. 1038/srep 27486
Non-Patent Document 5: Hatz C. et al., 2013, Nature Rev. Drug Discov. Vol. 12, p. 703-719
Non-Patent Document 6: Hetz C., 2012, Nature Rev. Mol. Cell Biol., Vol. 13, p. 89-102
Non-Patent Document 7: Guillen C., 2016, Ann. Transl. Med. Suppl. 1, S45
Non-Patent Document 8: Gu Y. et al., 2012, Acta Pharmacol. Sinica, Vol. 33, p. 941-952
Non-Patent Document 9: Liu H. et al., 2016, Evidence-Based Comple. Alter. Med., Vol. 2016, Article ID7831282

SUMMARY OF THE INVENTION

Problems to be Solved by the Invention

However, the currently reported mouse models do not satisfy all of the symptoms known as the symptoms of the human excessive myopia. In other words, the models do not satisfy the symptoms such as the degree of extension of the eye axis length, the refractive index, or the sclera being thinner than in the normal state. The models are thus incomplete as a myopia model. The present invention aims to prepare a mouse model having myopia that closely resembles the symptoms of the human excessive myopia. As described in the model in Non-Patent Document 2, the conventional mouse models include a lens sutured to the skin, and further reinforced and fixed with adhesive so that it cannot be easily detached. Thus, it is difficult to observe the change over time associated with myopia progression. The present invention also aims to analyze the process of the myopia progression using the mouse myopia-induced model, search for a myopia therapeutic agent on the basis of the obtained knowledge, and obtain a therapeutic agent for suppressing myopia.

Means for Solving the Problems

The present invention relates to a myopia prevention/suppression agent, a method for preparing a mouse myopia-induced model, and a mouse myopia-induced model prepared by the preparing method, as well as a method for screening a medicine using the mouse myopia-induced model, as described below.
(1) Myopia prevention/suppression agent containing endoplasmic reticulum stress suppressant, and a PERK path inhibitor and an ATF6 path inhibitor of endoplasmic reticulum stress path inhibitors, as active ingredient.
(2) Myopia prevention/suppression agent according to (1), wherein
the endoplasmic reticulum stress suppressant is phenylbutyrate, tauroursodeoxycholic acid, or a pharmacologically acceptable salt thereof, and the endoplasmic reticulum stress path inhibitor is salubrinal, guanabenz, GSK2606414, GSK2656157, ISRIB, Azoramide, Arctigenin, or a pharmacologically acceptable salt thereof.
(3) Myopia prevention/suppression agent according to (1) or (2), wherein
the endoplasmic reticulum stress suppressant is phenylbutyric acid, tauroursodeoxycholic acid, or a pharmacologically acceptable salt thereof.
(4) Myopia prevention/suppression agent according to any one of (1) to (3), wherein
the myopia is axial myopia.
(5) Myopia prevention/suppression agent according to any one of (1) to (4), wherein
the myopia is pathologic myopia.
(6) Myopia prevention/suppression agent according to any one of (1) to (5), wherein
a dosage form is an eye drop.
(7) A mouse myopia-induced model preparing method comprising the steps of:
mounting a protector and a minus lens in front of eyes of a juvenile mouse; and
adjusting an angle and a width thereof with an adjustment mechanism in response to growth of the mouse to raise the mouse.
(8) A myopia prevention/suppression medicine screening method comprising the steps of:
mounting a protector and a minus lens in front of eyes of a juvenile mouse;
adjusting an angle and a width thereof with an adjustment mechanism in response to growth of the mouse; and
administering a candidate material to a mouse model having myopia induced thereto.
(9) A mouse myopia-induced model prepared by mounting a protector and a minus lens in front of eyes of a juvenile mouse, adjusting an angle and a width thereof with an adjustment mechanism in response to growth of the mouse, and raising the mouse. In other words, a mouse myopia-induced model obtained by mounting a protector, a detachable minus lens, and an adjustment mechanism capable of adjusting an angle and a width thereof in response to growth of the mouse in front of eyes of the juvenile mouse, and raising the mouse.

Effect of the Invention

A mouse myopia-induced model has been prepared that includes symptoms similar to those seen in the human excessive myopia. Because gene manipulation technologies are more available to a mouse compared to other animals, a good tool can be provided to research genetic factors of myopia. Further, analysis results of the model mouse have revealed that myopia induction causes endoplasmic reticulum stress in sclera. Furthermore, it has been shown that the endoplasmic reticulum stress induces myopia because provision of endoplasmic reticulum stress induces myopia. In addition, experiments using the mouse myopia-induced model have revealed that endoplasmic reticulum stress suppressant is effective for myopia suppression. Therefore, it has become possible to provide a therapeutic agent for myopia in which no effective treatment has previously been available.

EMBODIMENTS OF THE INVENTION

Figure 1:
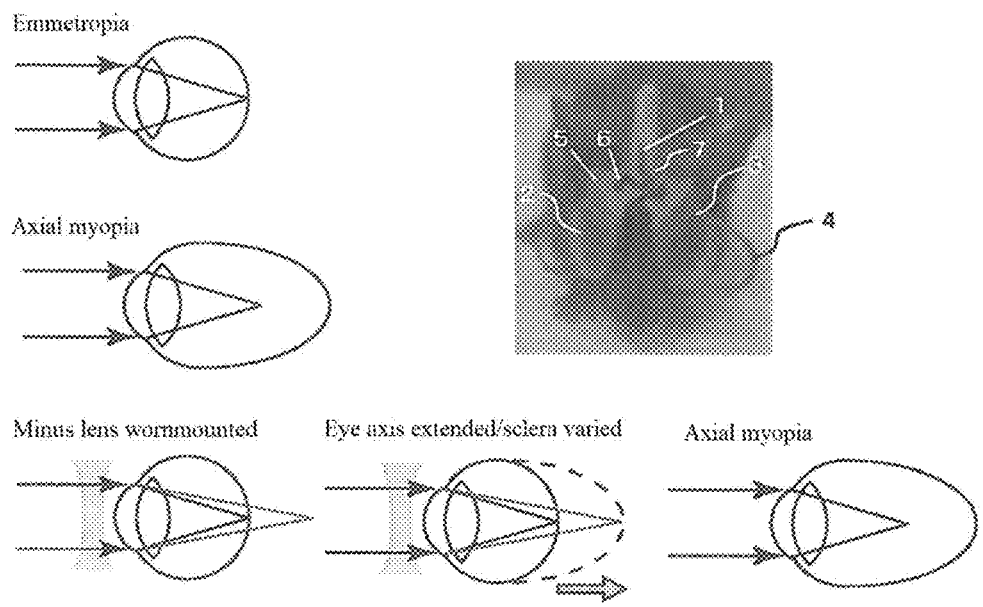
FIG. 1 is schematic views showing a method for preparing a mouse myopia-induced model.

The inventors have showed for the first time that myopia induction causes endoplasmic reticulum stress in the sclera. It has been previously known that endoplasmic reticulum stress affects corneal endothelial cell, causing various diseases (Patent Document 1). However, it has not been previously reported that myopia correlates with endoplasmic reticulum stress and endoplasmic reticulum stress induces myopia. Furthermore, the fact that endoplasmic reticulum stress suppressant suppresses the progression of myopia has been found by the inventors for the first time. Note that, in the present application, "myopia prevention/suppression" means "myopia prevention or suppression."

Further, the myopia-induced models have been previously prepared with various animals, and a mouse myopia-induced model has also been reported (Non-Patent Documents 1 and 2). However, a model has not been previously reported that shows all symptoms equivalent to those of human myopia, i.e., changes in the refractive value, the axial length of the eye, and the sclera. A mouse model showing symptoms similar to those of human has been prepared by the method of the inventors for the first time. It has thus become possible to research genetic factors of myopia that have not been previously revealed, allowing for screening of medicine for the radical treatment of myopia. Actually, the inventors have found that endoplasmic reticulum stress suppressant suppresses myopia induction in the mouse model.

In screening of myopia prevention/suppression agent, candidate compounds may be administered at any timing. In other words, administration of the candidate compounds may be started just after starting myopia induction, or after starting myopia induction and after a certain degree of symptom of axial myopia is recognized. Further, administration period and timing can also be determined as appropriate depending on the candidate compounds.

The myopia suppressant is administered here by intraperitoneal administration and eye drop, although any administration form may be adopted. Specifically, administration by injection, application by eye drops or eye ointments, or oral administration may be used. Therefore, the dosage form may include, in addition to injection, eye drops, eye ointments, or those suited for internal medicine such as tablets or capsules. Particularly, eye drops or eye ointments are preferable because they can be directly applied to eyes.

Further, the endoplasmic reticulum stress suppressant includes here sodium phenylbutyrate (4-phenylbutyricacid; 4-PBA), and Tauroursodeoxycholic acid (TUDCA), although pharmacologically acceptable salts other than these compounds may be used. Pharmacologically acceptable salts include an alkali metal salt, an alkaline earth metal salt, and an addition salt of an amine or a basic amino acid.

Furthermore, any agents may be used that can suppress endoplasmic reticulum stress. It is said that chemical chaperones, such as sodium phenylbutyrate, tauroursodeoxycholic acid, and trehalose, which contribute to forming and stabilization of the higher-order structure of protein, may reduce the endoplasmic reticulum stress. In addition, signals downstream of endoplasmic reticulum stress sensors can be inhibited to suppress the endoplasmic reticulum stress signal (Non-Patent Documents 3 to 5). However, even though having different mechanisms of actions, any compounds that have actions of reducing the endoplasmic reticulum stress or suppressing signals from endoplasmic reticulum stress sensors may act as myopia prevention/suppression agents.

The endoplasmic reticulum stress is sensed by three stress sensors that then transmit the signals downstream so that unfolded proteins do not excessively accumulate. It is known that the endoplasmic reticulum stress sensors include three paths: PERK (PKR-like endoplasmic reticulum kinase) path; IRE1 (Inositol requiring 1) path; and ATF6 (Activating transcription factor 6) path (Non-Patent Document 6). Therefore, an agent may be used that reduce the endoplasmic reticulum stress by inhibiting the signal transfer in any of those paths.

Such an agent includes Salubrinal, Guanabenz, GSK2606414, GSK2656157, integrated stress response inhibitor (ISRIB), STF-083010, MKC-3946, Toyocamycin, Nelfinavir, Sunitinib, 4μ8C (7-Hydroxy-4-methyl-2-oxo-2H-1-benzopyran-8-carboxaldehyde), or the like (Non-Patent Document 5). Among others, agents of PERK path and ATF6 path are effective as described in the examples. Therefore, PERK path inhibitors such as Salubrinal, Guanabenz, GSK2606414, GSK2656157, and ISRIB can function as effective myopia suppressants. In addition, Patent Document 2 discloses PERK inhibitors including GSK2606414 and GSK2656157. It should be appreciated that the inhibitors described in Patent Document 2 can also be used.

Further, it is believed that Azoramide and Arctigenin may inhibit the endoplasmic reticulum stress more upstream (Non-Patent Documents 7 and 8). Therefore, these agents are also considered to act as the myopia suppressant.

Further, natural compounds included in a plant or the like, such as Astragaloside IV, Baicalein, Berberine, Crosin, Elatoside C, Ginsenoside Rb1, Honokiol, Ikariin, Mangiferin, Notoginsenoside R1, and Pterostilbene may be the compounds that suppress the endoplasmic reticulum stress (Non-Patent Document 9).

[Example 1] Preparing of Mouse Myopia-Induced Model

First, a description will be given below with respect to a method for preparing a mouse model of the present invention. FIG. 1 schematically shows a mechanism in which a minus lens is worn to induce the axial myopia. The emmetropia refers to a condition in which parallel rays entering the eyes focus into an image on the retina and thus one can see images clearly. On the other hand, the axial myopia refers to a condition in which parallel rays entering the eyes focus into an image in front of the retina because of long axial length of the eye, and thus one cannot see clearly. The eyes of animals, including a human, enlarge as they grow. If a juvenile mouse is worn with a minus lens, the eye axis will extend to the position at which an image is focused when the minus lens is worn, i.e., the condition in which one can see clearly with the minus lens worn. As a result, the eye axis extends, resulting in an eye condition similar to the axial myopia.

Specifically, the mouse myopia-induced model is prepared as follows. Because it is easier to induce myopia to a juvenile mouse, it is preferable to mount the minus lens as soon as possible after the weaning. A 3-week-old C57BL6J is used here. The mouse is anesthetized with three types-mixed anesthetic of Domitor (Nippon Zenyaku Kogyo Co., Ltd.), Betorphal (Meiji Seika Pharma Co., Ltd.), and Midazolam (Sandoz K. K.). The skull is then opened with scissors. A post 1 is erected in the skull and fixed with dental cement (Super-Bond, Sun Medical Co., Ltd.). The post is threaded to fix an adjusting instrument described later with a nut.

To induce myopia, −30 diopter (D) minus lens (Rainbow contact, Rainbow Optical Laboratory Co., Ltd.) 2 is mounted on one side, and OD lens or only frame 3 is mounted on the other side as a control. A protector 4 having a laterally projected shape is mounted to a frame part in the lower portion of the lens to prevent the mouse from damaging the lens with its forelegs or the like when mounting the lens to the mouse. The protector 4 prevents the mouse from touching the lens, causing no damages on the lens. The protector 4 used here is in the form mounted to the frame part and integrated with it, although it needs not be integrated with the lens as long as the mouse behavior will not damage the lens. For example, it may have a shape like an Elizabethan collar worn by injured animals.

An adjusting instrument 5 is bonded to a frame part in the upper portion of the lens to adjust the width and angle of the mounted lens in response to the growth of the mouse. The adjusting instrument 5 is folded in a dog leg shape. The adjusting instrument 5 includes one side mounted with the lens and the other side provided with a slot 6 for mounting the adjusting instrument 5 to the post 1 erected in the head. Putting the post 1 over the slot 6 and screwing it with a nut 7 can adhere and fix the adjusting instrument 5 to the skin without compressing the periphery of both eyes of the mouse.

An adjustment mechanism including three parts of the post 1, the nut 7, and the adjusting instrument 5 can adjust the width and angle to bring the lens to the mouse eye position in response to the growth of the mouse. Further, because the lens is detachable, it is possible to measure the change over time of the axial length of the eye and the refractive value. As described above, in the conventional models, it is impossible to observe the change over time in the myopia progression, whereas in this myopia-induced model, the lens can be detached easily and thus it is possible to analyze the myopia progression in more detail.

The left eye was worn with only a frame as a control and the right eye was worn with a −30D lens for three weeks. The refractive value, the axial length of the eye, and the sclera thickness were measured to find the differences between before and after wearing them. The refractive value was measured with a refractometer (Infrared photorefractor for mice, made by Proffesor Schaeffel, University of Tubingen). The axial length of the eye was measured with an SD-OCT (Spectral-Domain Optical Coherence Tomography, Envisu R4310, Bioptigen Inc.). The sclera thickness was measured by obtaining an optical image of a hematoxylin and eosin (HE) stained paraffin piece by an optical microscope (BX53, Olympus Corporation) and then using an imaging software cellSens. The results were analyzed with ANOVA, Turky HSD.

Figure 2:
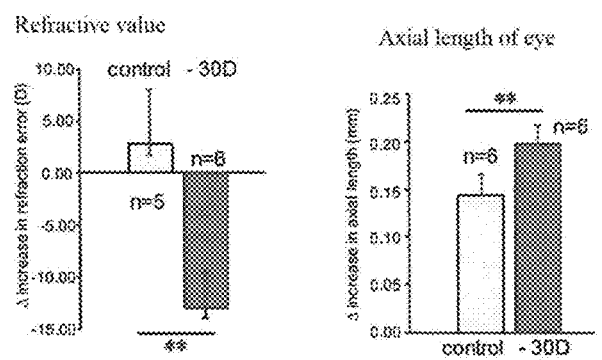
FIG. 2 is graphs showing changes in a refractive value, an axial length of the eye, and the sclera in the mouse myopia-induced model.
Figure 2:
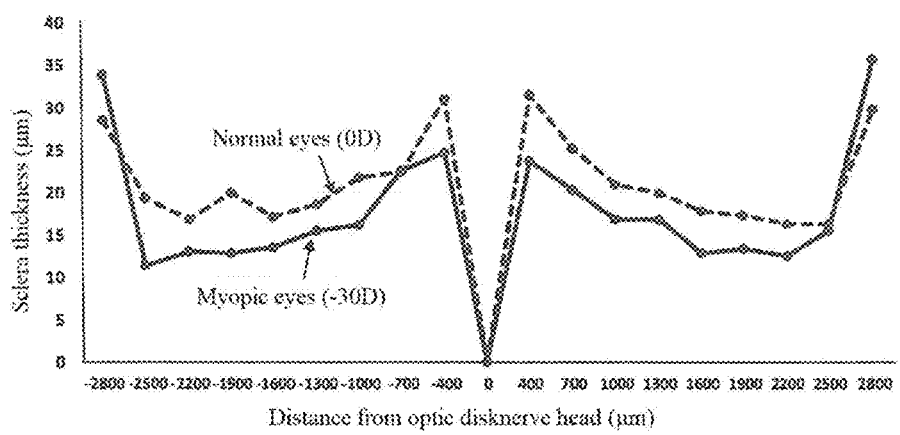

As shown in FIG. 2, significant differences were recognized in any of the refractive value, the axial length of the eye, and the sclera thickness for the myopia-induced eyes with the −30D lens against the control (in the figure, * indicates p<0.05 and ** indicates p<0.01, the same in the following figures as well). For the sclera thickness as well, it was observed that regardless of the distance from the optic disk, the myopic eyes have thinner sclera thickness than the normal eyes.

The myopia-induced models previously reported do not satisfy all symptoms of the excessive myopia reported in a human, such as changes in the refractive value, the axial length of the eye, and the sclera. In contrast, the myopia-induced model prepared in this example includes all characteristics of the human axial myopia, indicating that it may be an excellent model. It may be because that in this myopia-induced model, it is possible to finely adjust the lens position in association with the growth, and further to induce the axial myopia more significantly with a protector for protecting the lens to prevent damages on the lens.

Figure 3:
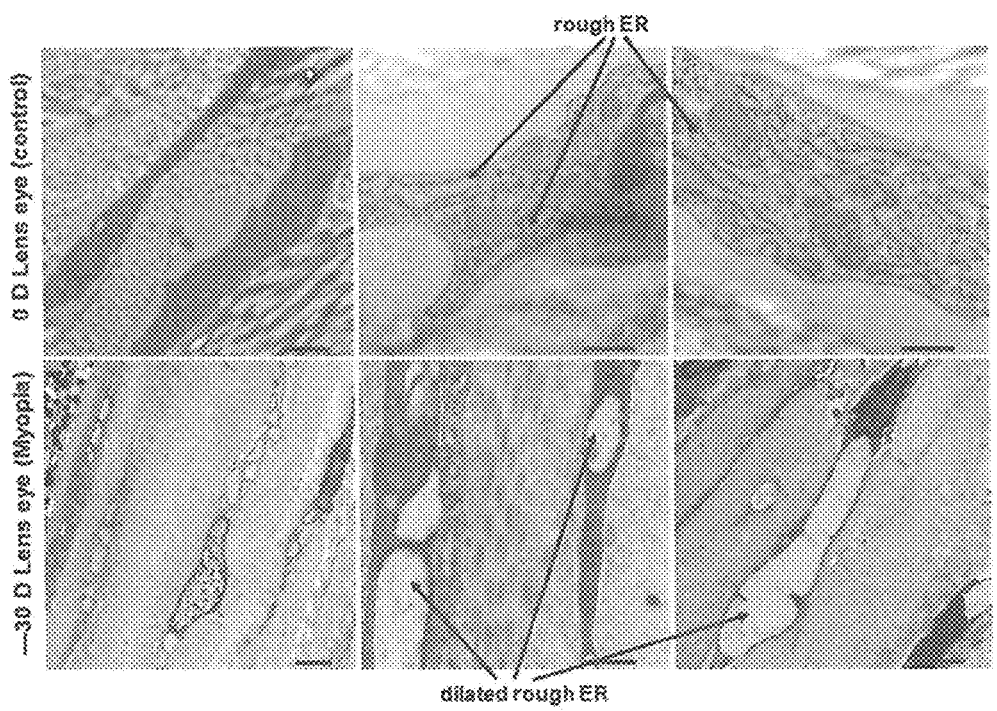
FIG. 3 is electron microscopy images showing changes in the sclera in the mouse myopia-induced model.

[Example 2] Screening of the Therapeutic Agent Using the Mouse Myopia-Induced Model To investigate the pathological condition of the myopia-induced model in more detail, a transmission electron microscope (TEM) was used for analysis. An eyeball that was worn with a minus lens for three weeks and had axial myopia induced thereto and an eyeball that was worn with only a frame as a control were removed from a mouse and then fixed in 2.5% glutaraldehyde/physiological saline for one hour at 4° C. The cornea was removed and post-fixed in 2.5% glutaraldehyde/physiological saline overnight. It was then embedded in Epok 812 (Okenshoji Co., Ltd.) and thinly sectioned for observation under TEM (JEM-1400 plus, JEOL Ltd.). In FIG. 3, the upper shows the control and the lower shows the sclera of the sample from the mouse that was worn with the −30D lens and had myopia induced thereto. The scale is 1.0 pin, 500 nm, and 500 nm from left to right.

The upper image of the control shows that most of the mouse sclera consists of collagen fiber and fibroblast. The fibroblast in the control is rich in mitochondrion and rough-surfaced endoplasmic reticulum (indicated by the upper arrows). On the other hand, a number of extended vacuolar endoplasmic reticulum (ER) were observed (indicated by the lower arrows) in the sclera of the myopia-induced mouse using the minus lens, suggesting that the endoplasmic reticulum stress occurs.

(1) Effects of Sodium Phenylbutyrate as the Endoplasmic Reticulum Stress Suppressant The observation results under the electron microscope suggested that myopia induction causes the endoplasmic reticulum stress. Then, an analysis was conducted to check for suppression of myopia induction by administration of endoplasmic reticulum stress suppressant. As the endoplasmic reticulum stress suppressant, sodium phenylbutyrate (Cayman Chemical Company) at dose of 200 mg/kg/day was intraperitoneally administered daily from two days to 21 days after wearing the lens, and on the 21st day the refractive value and the axial length of the eye were measured. Note that only phosphate-buffered saline (PBS) was administered to the control group.

Figure 4A:
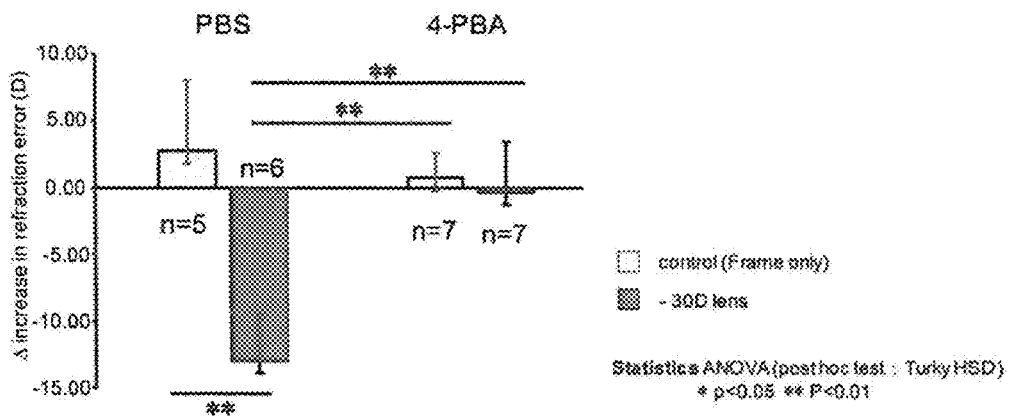
FIGS. 4A-4C are graph showing effects of sodium phenylbutyrate (4-PBA) as endoplasmic reticulum stress suppressant on myopia induction, FIG. 4A showing changes in the refractive value, FIG. 4B showing changes in the axial length of the eye, and FIG. 4C showing changes in the axial length of the eye at one week and at three weeks after the lens is worn.

FIG. 4A shows variation in the refractive value. In the PBS administered group as the control, when the −30D lens was worn, significant changes were recognized in the refractive value. Nevertheless, in the sodium phenylbutyrate (4-PBA) administered group, no changes were recognized in the refractive value between the −30D lens-worn eyes and the only frame-worn eyes, indicating that the sodium phenylbutyrate has a myopia suppression effect.

Figure 4B:
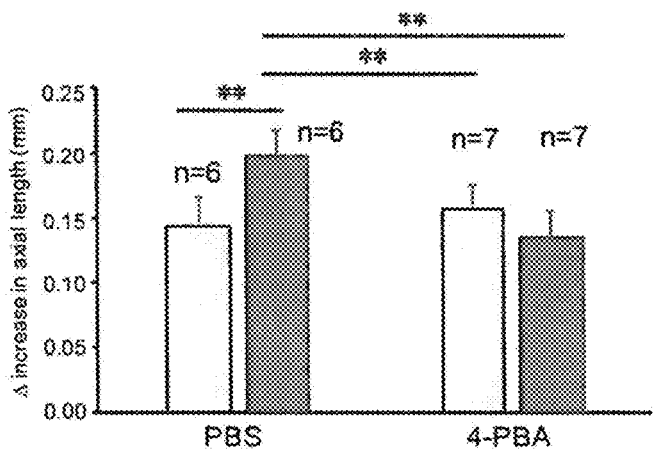

FIG. 4B shows changes in the axial length of the eye. In the sodium phenylbutyrate administered group, when the axial length of the eye was compared between the minus lens-worn eyes and the only frame-worn eyes as the control, no difference was recognized in the extension. On the other hand, in the PBS administered group, the axial length of the eye of the minus lens-worn eyes significantly extended even against the minus lens-worn group in the sodium phenylbutyrate administered group.

Figure 4C:
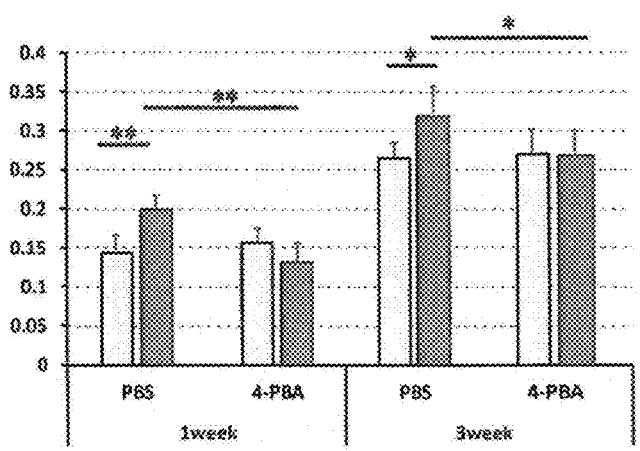

Next, it will be shown that the axial length of the eye extends in response to the growth, while the sodium phenylbutyrate does not suppress the eye axis extension associated with the growth. FIG. 4C shows the axial length of the eye at one week and three weeks after wearing the lens. The minus lens-worn eyes in the PBS administered group showed, at one week after wearing the lens, significant extensions against the lens-unworn control eyes, and the lens-worn eyes and lens-unworn eyes in the sodium phenylbutyrate administered group. The axial length of the eye at three weeks after starting lens wearing extended than the axial length of the eye at one week after starting lens mounting, in any groups as well. Even the sodium phenylbutyrate administered group showed the same degree of extension as the axial length of the eye in the only frame-mounted eyes in the PBS administered group, indicating that the sodium phenylbutyrate does not affect the extension of the normal axial length of the eye associated with the growth.

The sodium phenylbutyrate is an agent that is already permitted to be applied to the urea cycle disorder and thus its safety is verified for a human as well. Further, since it is also obvious as described above that the sodium phenylbutyrate does not prevent the extension of the normal axial length of the eye, it is very promising as an agent for suppressing the progression of the excessive myopia.

Figure 5:
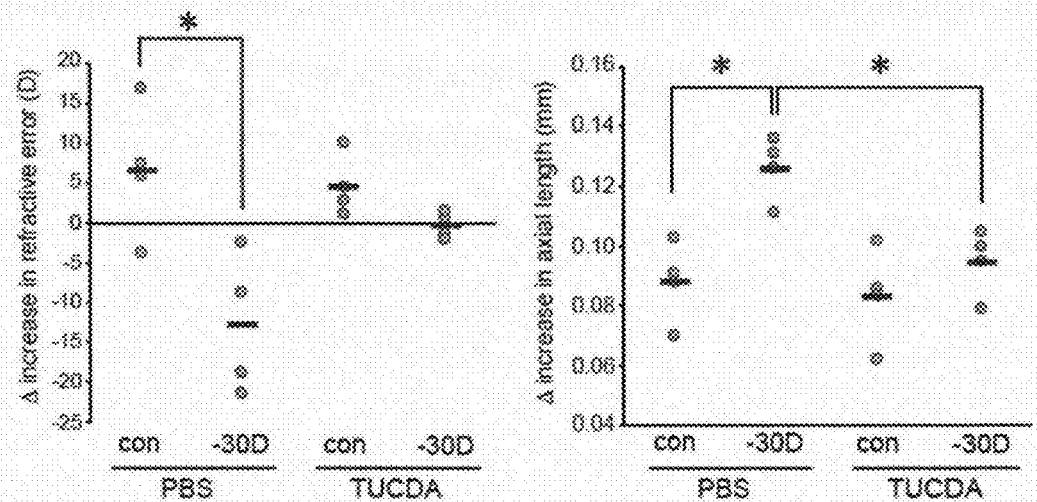
FIG. 5 is graphs showing effects of tauroursodeoxycholic acid as endoplasmic reticulum stress suppressant on myopia induction.

(2) Effects of Tauroursodeoxycholic Acid as the Endoplasmic Reticulum Stress Suppressant Next, the effects of tauroursodeoxycholic acid also known as the endoplasmic reticulum stress suppressant were analyzed. As in Example 1, a 3-week-old male C57BL6J mouse was used for analysis. The right eye of the mouse was worn with a −30D lens and the left eye was worn with only a frame. From the day when the lens was worn, 100 mg/kg of tauroursodeoxycholic acid (Sigma-Aldrich Co. LLC) was administered once a day by intraperitoneal administration (n=4), and the equal amount of PBS was intraperitoneally administered to the control group (n=4). Before and at one week after wearing the lens, the axial length of the eye and the refractive value were measured to calculate the variation. FIG. 5 shows changes in the refractive value in the left and changes in the axial length of the eye in the right.

In the PBS administered group as the control, significant changes were recognized in the refractive value between the −30D lens-worn eyes and the only frame-worn eyes. Nevertheless, in the tauroursodeoxycholic acid administered group, no differences were recognized between both types of eyes, indicating that the tauroursodeoxycholic acid has a myopia suppression effect. Further, significant changes were recognized in the axial length of the eye of the myopia-induced eyes between the tauroursodeoxycholic acid administered group and the PBS administered group, indicating that tauroursodeoxycholic acid has an effect on changes in the axial length of the eye as well.

(3) Effects of Endoplasmic Reticulum Stress Suppressant by Eye Drop

As an agent for suppressing myopia, it is preferable to use a dosage form such as eye drops or eye ointments that can be administered directly on the eyes, because it is expected to be highly effective and can be administered by patients themselves. Then, a mouse myopia-induced model was prepared as in Example 1 for analysis of effects of sodium phenylbutyrate by eye drop.

Figure 6:
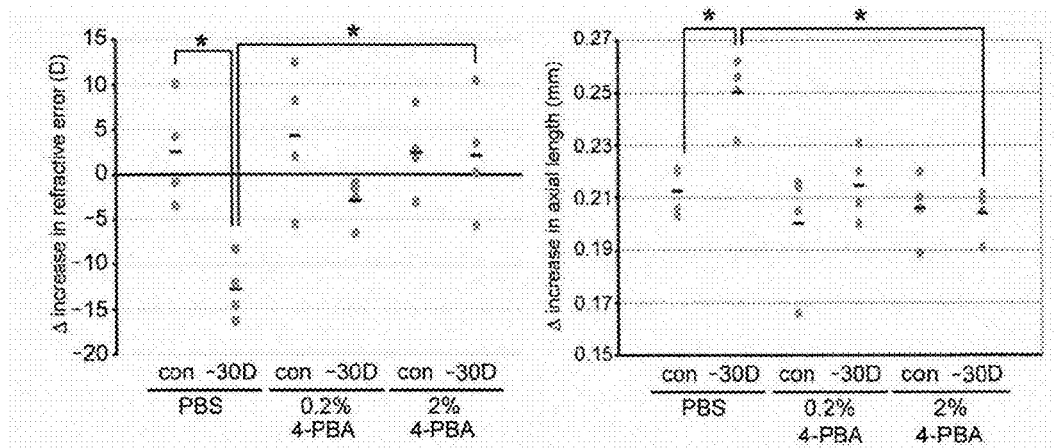
FIG. 6 is graphs showing effects of sodium phenylbutyrate on myopia induction by eye drop.

A lens was worn on a 3-week-old male C57BL6J mouse. From the day when the lens was worn, both eyes were administered daily once a day by eye drop with sodium phenylbutyrate solution of sodium phenylbutyrate dissolved in PBS to provide 0.2% (n=4) or 2% (n=4). The control group (n=4) was administered by eye drop with PBS. Before and at three weeks after wearing the lens, the refractive value (in the left of FIG. 6) and the axial length of the eye (in the right of FIG. 6) were measured to calculate the variation.

For the lens-worn and myopia-induced eyes, significant differences were recognized in the refractive value and the axial length of the eye in the 2% sodium phenylbutyrate administered group compared to the PBS administered group. Therefore, it is indicated that sodium phenylbutyrate has an effect on myopia suppression by eye drop administration as well. Further, the 0.2% sodium phenylbutyrate administered group also showed a tendency to suppress changes in the refractive value and the axial length of the eye, although no significant differences were recognized against PBS administered group.

[Example 3] Effects of Endoplasmic Reticulum Stress Induction on Myopia

Figure 7:
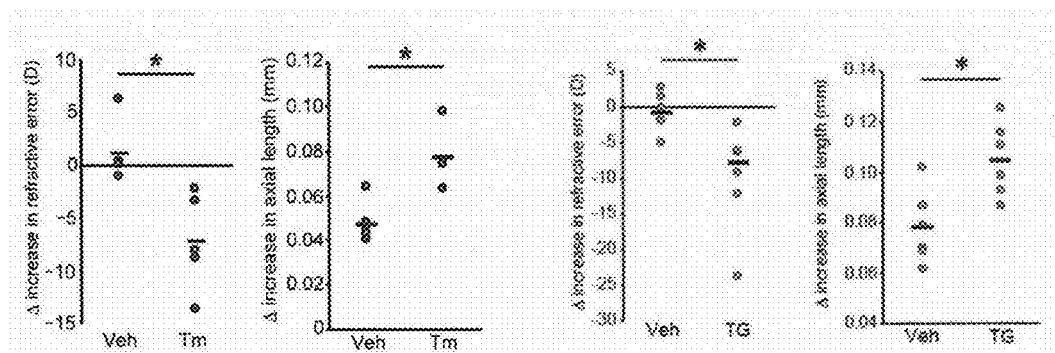
FIG. 7 is graphs showing analysis results of myopia induced by endoplasmic reticulum stress inducer.

Because the endoplasmic reticulum stress suppressant has a suppression effect on myopia induction as describe above, it is considered that the endoplasmic reticulum stress directly participates in myopia induction. Then, an analysis was conducted to check for induction of myopia by administration of an agent for inducing endoplasmic reticulum stress. The subject was a 3-week-old male C57BL6J mouse (n=12). The right eye of the mouse was administered once by eye drop with 50 µg/ml of tunicamycin (Tm) (Sigma-Aldrich Co. LLC) or 10 µM of thapsigargin (TG) (Wako Pure Chemical Industries, Ltd.), and the left eye was administered once by eye drop with PBS (Veh). Before and at one week after administration of tunicamycin and thapsigargin, the refractive value and the axial length of the eye were measured to calculate the variation (FIG. 7).

By administration of either agent of tunicamycin and thapsigargin, which are both known as an endoplasmic reticulum stress inducer, as well, significant differences were recognized both in the refractive value and the axial length of the eye against the PBS administered eyes, indicating that myopia was induced. In other words, it is shown that the endoplasmic reticulum stress directly induces myopia.

[Example 4] Effects of Endoplasmic Reticulum Stress Path Inhibitor on Myopia Induction As described above, it is known that the endoplasmic reticulum stress has three paths: an IRE1 path; a PERK path; and an ATF6 path, downstream thereof. An analysis was conducted to check for a myopia induction suppression effect of inhibitors for the three endoplasmic reticulum stress paths.

STF-083010 (STF) was used as an IRE1 path inhibitor, GSK265615 (GSK) as a PERK path inhibitor, and Nelfinavir (NFV) as an ATF6 path inhibitor. The mouse myopia-induced model was administered with these agents for analysis to check for myopia induction suppression.

Figure 8A:
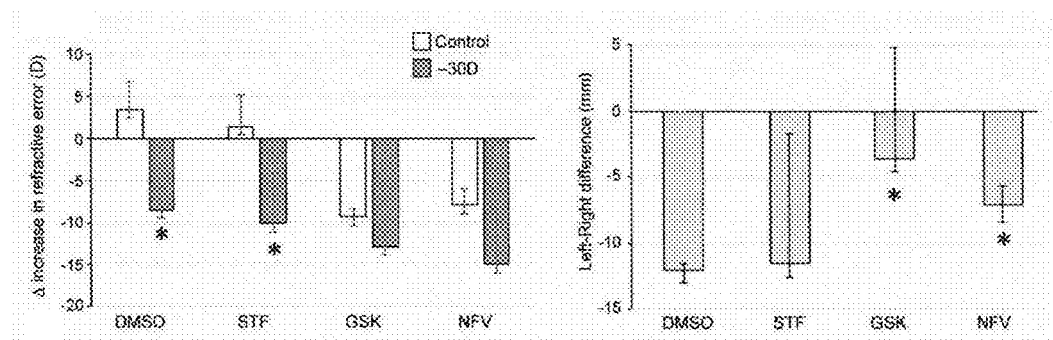
FIGS. 8A and 8B are graph showing effects of compounds inhibiting signal paths of different endoplasmic reticulum stress sensors, FIG. 8A showing analysis results of a refractive value, and FIG. 8B showing analysis results of the axial length of the eye.
Figure 8B:
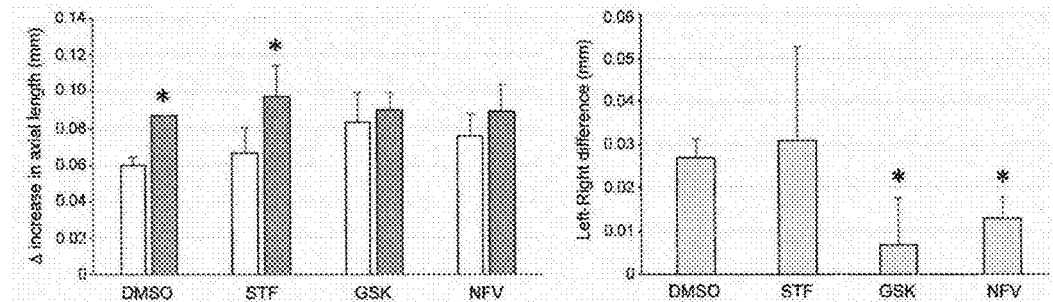

As in Example 1, a 3-week-old male C57BL6J mouse was used, and its right eye was worn with a −30D lens and the left eye was worn with only a frame. From the day when the lens was worn, both eyes were administered daily once a day by eye drop with 60 µM of STF-083010 (Sigma-Aldrich Co. LLC) (n=3), 50 µM of GSK2656157 (Cayman Chemical Company) (n=3), or 50 µM of Nelfinavir (Tokyo Chemical Industry Co., Ltd.) (n=3) dissolved in PBS. The control group (n=3) was administered by eye drop with 0.1% DMSO (Sigma-Aldrich Co. LLC) dissolved in PBS. Before and at one week after wearing the lens, the refractive value and the axial length of the eye were measured to calculate the variation (FIGS. 8A and 8B). FIGS. 8A and 8B show, in the left graph, differences (variation) in the refractive value (FIG. 8A) and the axial length of the eye (FIG. 8B) between before and after wearing the lens. FIGS. 8A and 8B also compares, in the right graph, difference of variation in each individual by finding difference of variation between the lens-worn eyes and the control eyes.

Like DMSO, STF-083010 showed significant changes both in the refractive value and the axial length of the eye against the lens-unworn control eye, indicating that it did not suppress myopia induction. On the other hand, GSK2656157 and Nelfinavir eye-dropped groups showed changes in the refractive value and an extension of the axial length of the eye even in the lens-unworn control eye. However, the groups showed a significant decrease in difference of variation from the lens-worn and myopia-induced eye (in the right graphs of FIGS. 8A and 8B), and thus it is considered that they have a suppression effect on myopia induction.

The above results show that the endoplasmic reticulum stress induces myopia and suppression of the endoplasmic reticulum stress can suppress myopia induction. Further, It is shown that myopia can be suppressed by using agents such as phenylbutyrate and tauroursodeoxycholic acid that suppress the endoplasmic reticulum stress itself as well as by inhibiting the downstream signals that transmit the endoplasmic reticulum stress as well. Particularly, it is shown that inhibition of signals caused by the endoplasmic reticulum stress sensors PERK and ATF6 suppress myopia effectively.

INDUSTRIAL APPLICABILITY

It is revealed that an endoplasmic reticulum stress suppressant suppresses the progression of myopia in which no effective treatment has previously been available. Therefore, the endoplasmic reticulum stress suppressant may act as a therapeutic agent for myopia. Further, a myopia-induced model including symptoms similar to those of human has been prepared using a mouse to which genetic analysis is easily performed. In future, the mouse myopia-induced model can be used to clarify the molecular mechanism of the myopia occurrence and develop a molecular target drug.

DESCRIPTIONS OF REFERENCE NUMERALS

1 Post
2 Minus lens
3 Frame
4 Protector
5 Adjusting instrument
6 Slot
7 Nut

What is claimed is:

1. A method of suppressing a symptom or progression of pediatric myopia, the method comprising:
administering an eye drop comprising 4-phenylbutyric acid or a pharmacologically acceptable salt thereof to a pediatric subject with progressing myopia in need thereof, wherein the symptom of pediatric myopia comprises an elongated axial length of the eyeball.

2. The method according to claim 1, wherein a content of 4-phenylbutyric acid or a pharmacologically acceptable salt thereof in the eye drop is from 0.2% to 2%.

3. The method according to claim 1, wherein the eye drop is administered once a day.

4. The method according to claim 1, wherein the eye drop is administered for three weeks or more.

5. The method according to claim 1, wherein the eye drop is administered during a period that 4-phenylbutyric acid or a pharmacologically acceptable salt does not affect the extension of the normal axial length of the eye associated with the growth.

6. The method according to claim 1, wherein the 4-phenylbutyric acid or a pharmacologically acceptable salt thereof is a salt sodium phenylbutyrate.

* * * * *